Sept. 29, 1953  J. G. BLAKEY  2,653,786
WEIGHING AND MIXING DEVICE
Filed April 21, 1948 4 Sheets-Sheet 1
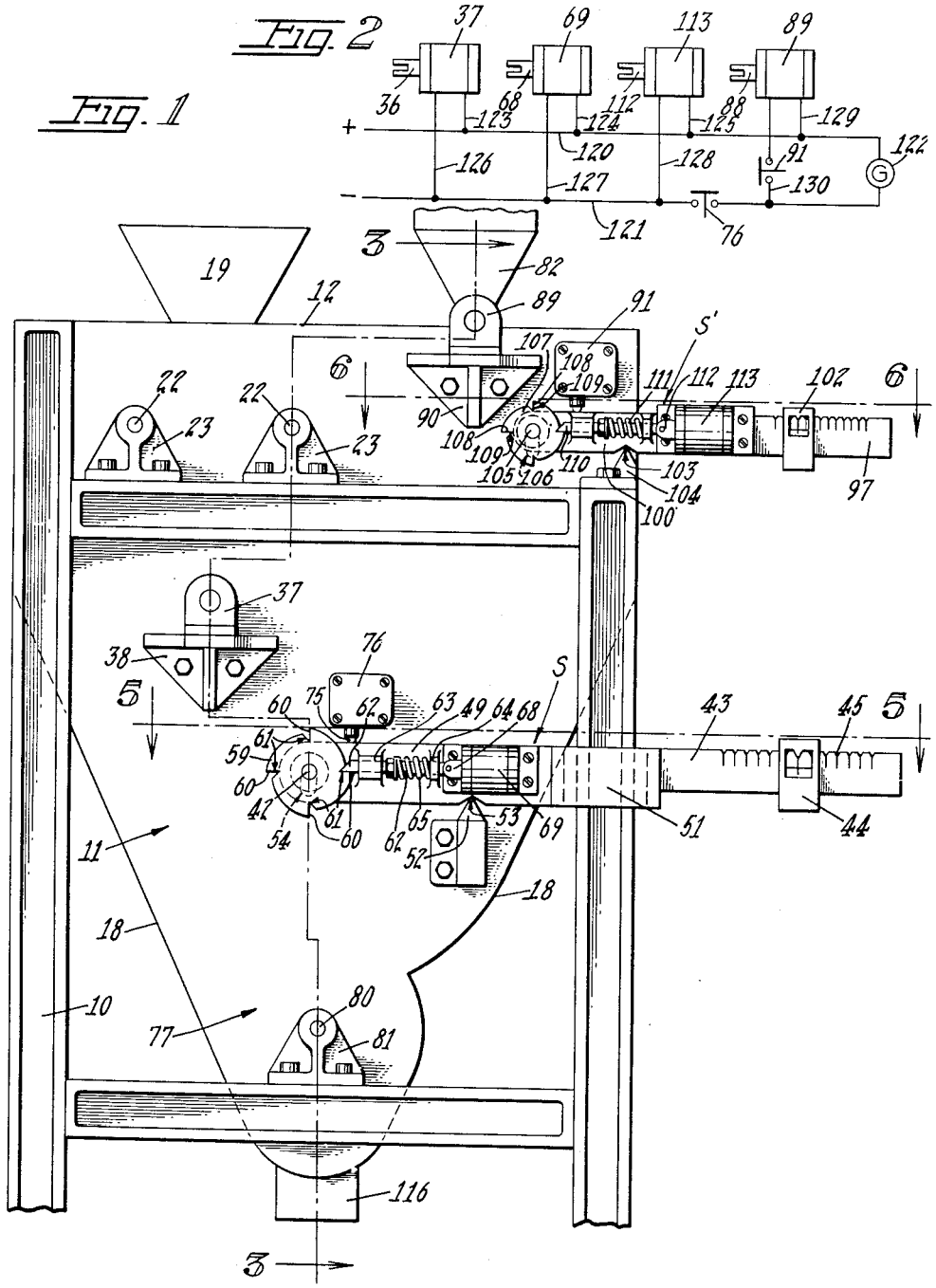
INVENTOR
John G. Blakey
BY Ivan D. Thornburgh
Charles H. Lune
ATTORNEYS

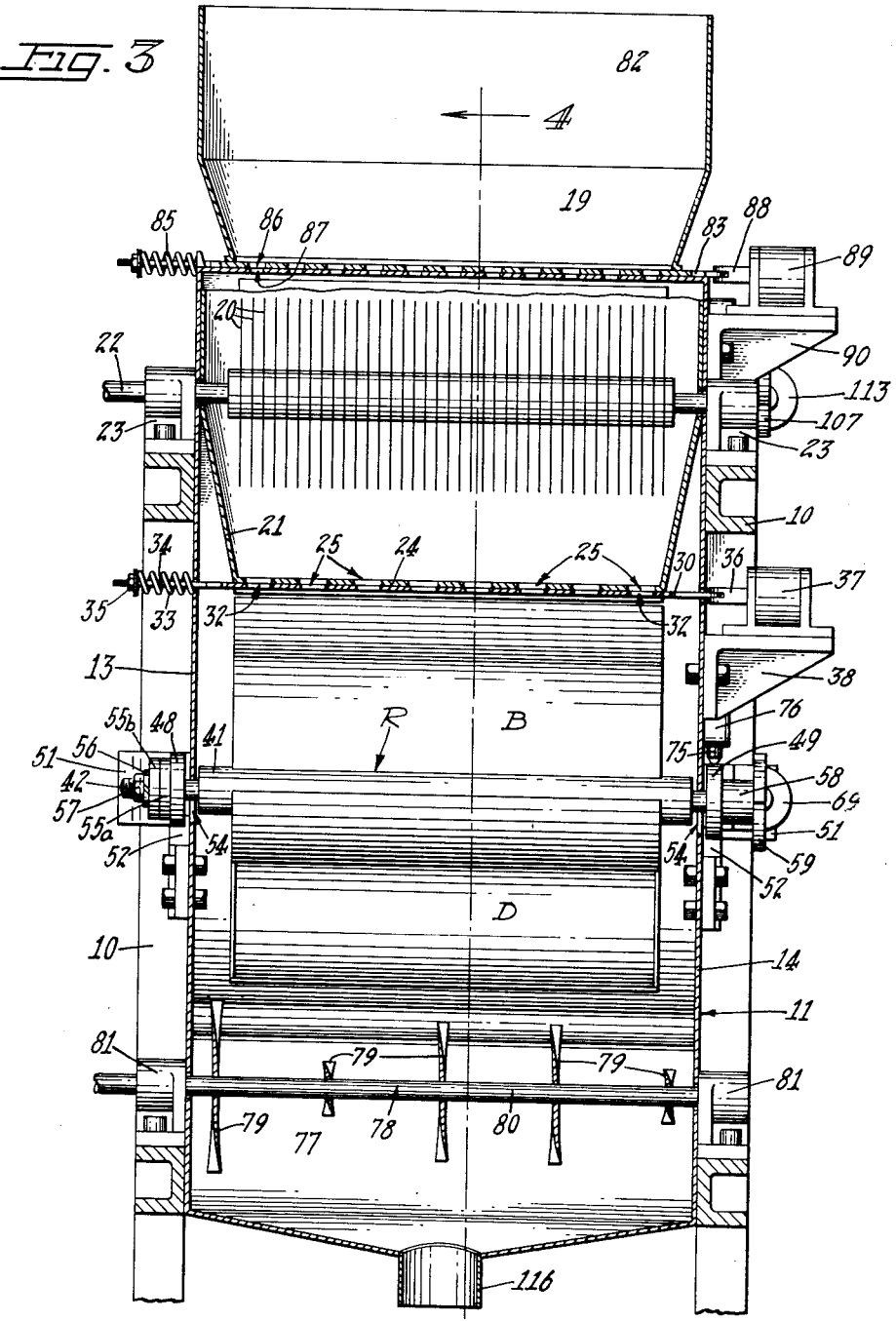

Sept. 29, 1953  J. G. BLAKEY  2,653,786
WEIGHING AND MIXING DEVICE
Filed April 21, 1948  4 Sheets-Sheet 3

INVENTOR
John G. Blakey
BY Ivan D. Thornburgh
Charles H. Erne
ATTORNEYS

Sept. 29, 1953 J. G. BLAKEY 2,653,786
WEIGHING AND MIXING DEVICE
Filed April 21, 1948 4 Sheets-Sheet 4
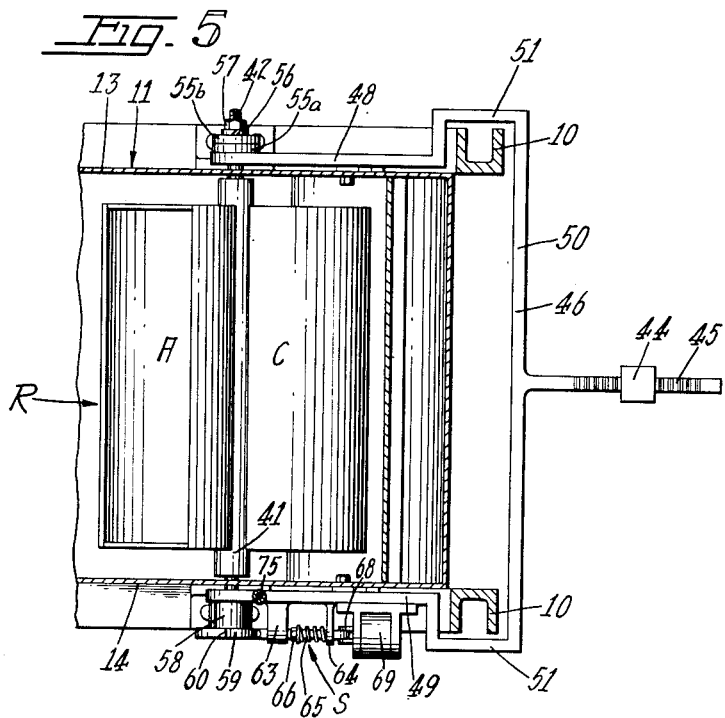
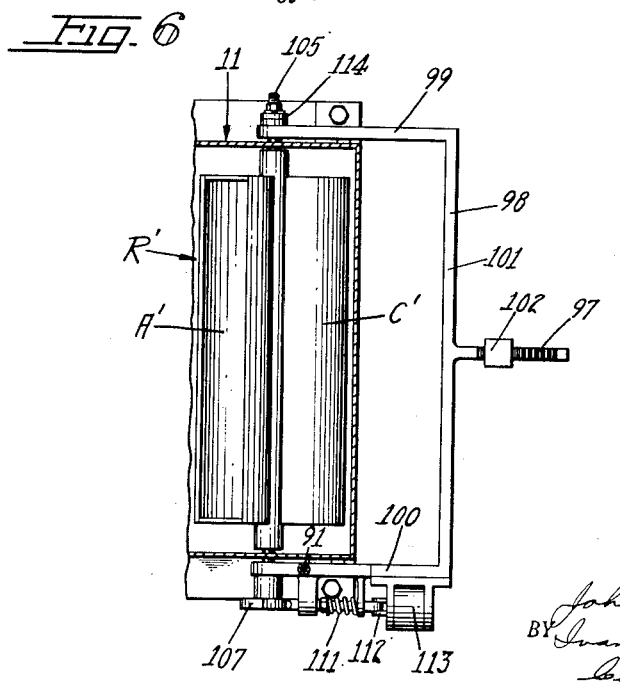
INVENTOR.
John G. Blakey
BY Ivan D. Thornburgh
Charles H. Gene
ATTORNEYS Patented Sept. 29, 1953

2,653,786

UNITED STATES PATENT OFFICE 2,653,786

WEIGHING AND MIXING DEVICE

John G. Blakey, Portland, Oreg., assignor to American Can Company, New York, N. Y., a corporation of New Jersey Application April 21, 1948, Serial No. 22,456

3 Claims. (Cl. 249—22)

This invention relates to a weighing and mixing machine and has particular reference to a machine for segregating and weighing batches of different materials in predetermined proportionate weights and mixing the weighed materials into a substantially uniform mass.

In the packing of berry fruits, for example, it is the usual practice to prepare mixtures of sliced berries and sugar by employing a sequence of manual or semiautomatic operations which are comparatively slow. As a result, it often happens that the products are left standing for long periods of time, thus exposing them to oxidation, dust and/or insects and facilitating the formation of sticky residues. This old practice is also objectionable in that it is inefficient, expensive, and vulnerable to the fallibilities of the operators, with the result that disproportionate amounts of fruit and sugar are apt to be mixed.

The instant invention overcomes these problems and many others by providing a single organized machine wherein all of the operations are performed automatically, accurately, and sanitarily.

An object of the invention, therefore, is the provision of a machine wherein fruit such as berries or the like is received from a continuous source of supply, is sliced, and is segregated into batches of predetermined weight which are mixed with proportionate weights of a flavoring and/or preserving material such as sugar.

Another object of this invention is the provision of an organized apparatus wherein the aforementioned operations are performed automatically and accurately within an enclosed housing which protects the treated products from unsanitary and other deleterious influences.

Yet another object is the provision of a machine wherein a continuous supply of fruit is sliced and then mixed with a proportionate amount of sugar, the continuous flow of the products serving to keep the parts of the machine clean by preventing the accumulation of sticky residues.

Still another object of the invention is the provision of weighing units which operate automatically and accurately to segregate predetermined proportionate weights of the different substances to be mixed, and which may be easily adjusted to vary the proportions of the weighed substances.

A further object of this invention is the provision of a weighing tray which is so mounted on a balance beam that it is movable out of weighing position relative to the balance beam when a predetermined weight of a product is received therein.

A still further object of the invention is the provision of a weighing unit which includes a plurality of receiving trays so mounted that when the contents of one of the trays are discharged another of the trays is automatically brought into receiving position without waste of time and motion.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a machine embodying the instant invention, with parts broken away;

Fig. 2 is a wiring diagram of the various electrical parts of the machine illustrated in Fig. 1;

Fig. 3 is a vertical sectional view taken substantially along the line 3—3 in Fig. 1, with parts broken away;

Fig. 5 is a horizontal sectional view drawn at a reduced scale and taken substantially along the line 5—5 in Fig. 1, with parts broken away; and Fig. 6 is a horizontal sectional view drawn at a reduced scale and taken substantially along the line 6—6 in Fig. 1, with parts broken away.

Figure 4:
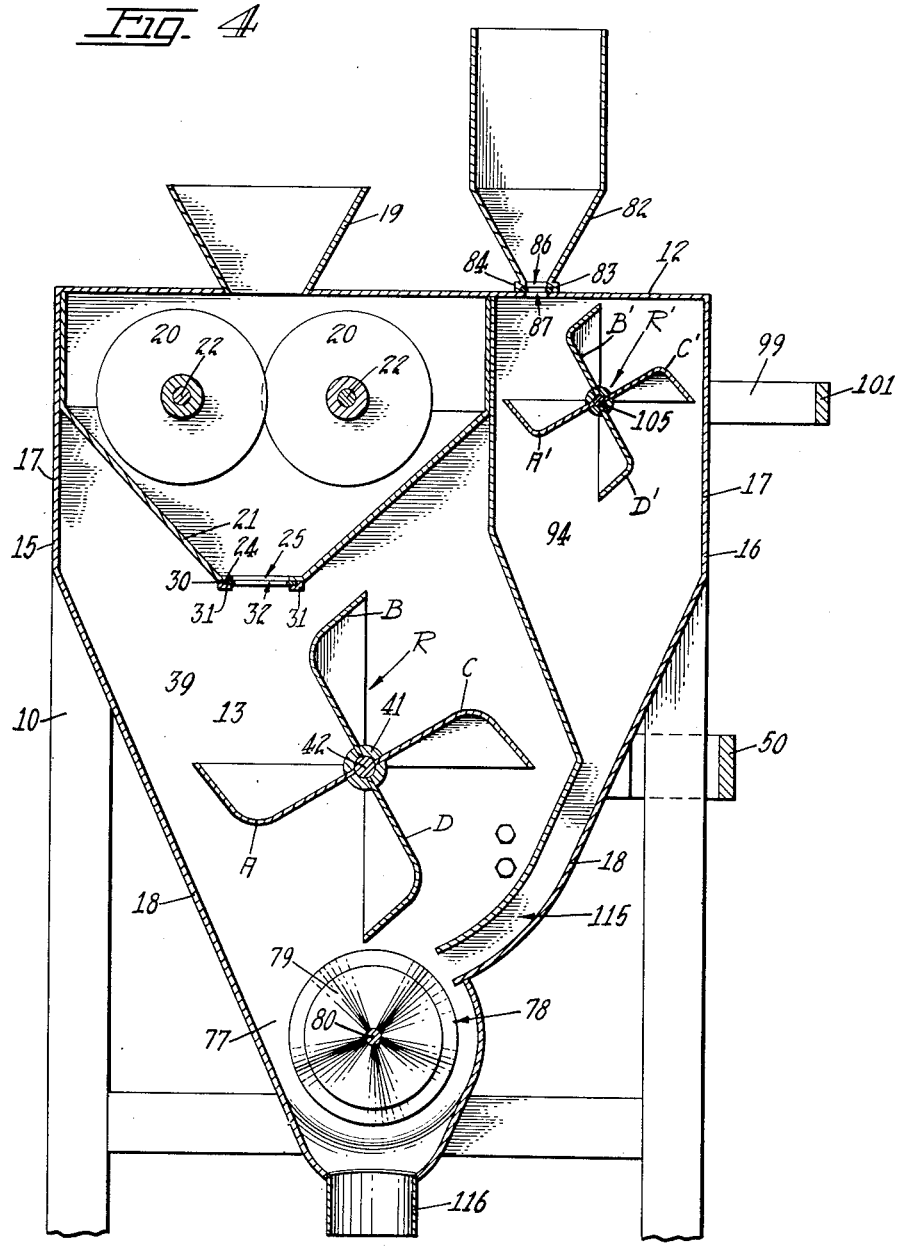
Fig. 4 is a vertical sectional view taken substantially along the line 4—4 in Fig. 3, with parts broken away.

As a preferred embodiment of this invention, the drawings disclose a machine for slicing and weighing berries and mixing the same with sugar. The principal parts of the machine are supported by a main frame 10 composed of a suitable arrangement of upright and horizontal channel irons.

Mounted on the main frame 10 is an outer protective housing or shell 11 consisting of a cover plate 12, two parallel side walls 13, 14, and two end walls 15, 16 having parallel upper portions 17 and convergent lower portions 18 (Figs. 1 and 4), which terminate in a rounded, transversely tapered bottom.

Selected berries or other fruits which are to be treated in this machine are introduced in any suitable manner into an intake hopper 19 which extends transversely of the machine above the protective housing 11. The fruit drops through the bottom of the hopper 19 directly into two sets of rotary slicing knives 20 (Figs. 3 and 4) located within a slicing hopper, chamber or compartment 21 disposed within the protective housing 11. There are a plurality of these slicing knives 20 mounted in closely spaced relation on a pair of shafts 22, journaled in bearings 23, bolted to the main frame 10. The shafts 22 are rotated in opposite directions in unison by any suitable means.

As the berries drop from the intake hopper 19 they pass between the rotary knives and are sliced into sections of desirable size which fall to the bottom of the slicing chamber 21 where they are temporarily retained and periodically released for weighing. For this purpose the bottom wall 24 of slicing chamber 21 is provided with a series of openings 25 which are adapted to be closed by means of a gate 30 (Figs. 3, 4) which is slidable in tracks 31 secured to the underside of the chamber. The gate 30 is provided with a series of openings 32 which correspond to the openings 25 in the chamber bottom wall 24. When these openings are in register the sliced berries are permitted to pass through the slicing chamber 21.

The sliding gate 30 is normally held in open position by a coil spring 33 (Fig. 3) which surrounds a lateral rod extension 34 of one end of the gate 30 which extends beyond the side wall 13 of the machine housing 11. The spring is interposed between the wall 13 and a nut 35 threadedly secured to the outer end of the gate extension 34. The opposite end of gate 30 projects beyond the housing wall 14 and is secured to an armature 36 of a normally deenergized solenoid 37 mounted on a bracket 38 bolted to the housing wall 14. The solenoid 37 when energized in a manner to be hereinafter described, moves the gate to a closed position (to the right, as viewed in Fig. 3) to cut off the flow of sliced berries from the slicing chamber.

When the sliding gate 30 is in open position as shown in Figs. 3 and 4, the sliced berries from the slicing chamber 21 drop into a primary weighing chamber compartment or section 39 (Fig. 4) and are received in a shallow weighing bucket support or tray A of a berry or fruit rotor R (Figs. 3, 4, 5) which is disposed within the weighing compartment and which forms a part of a scale unit generally designated as S. The rotor R is preferably composed of four primary shallow buckets or trays A, B, C, D which are secured at spaced intervals, preferably at 90 degrees, to a sleeve 41 keyed to a shaft 42. It will be understood that a greater or lesser number of equiangularly spaced trays may be successfully substituted for the four trays illustrated in this preferred embodiment of the invention.

The scale unit S also includes a primary balance beam 43, one end of which carries an adjustable sliding weight 44, the setting of which can be easily determined with the aid of indicating notches or graduations 45. The other end of balance beam 43 is bifurcated to form a yoke 46 (Fig. 5) consisting of two parallel arms 48, 49, and a transverse connecting arm 50. The yoke 46 is disposed outside of the protective housing 11 and partially surrounds the main frame 10 and the housing, the parallel arms 48, 49 extending adjacent the housing side walls 13, 14 and being offset outwardly at 51 to clear the main frame 10 as shown in Fig. 5.

The scale unit S is balanced on two knife edge fulcrums 52 disposed one on each side of the machine and engaging in notches 53 (Fig. 1), formed in the parallel arms 48, 49. One fulcrum 52 is bolted to each of the side walls 13, 14 of the housing 11.

The ends of the rotor shaft 42 pass through arcuate slots 54 cut in the housing side walls 13, 14 and are carried in bearings formed at the extremities of the balance beam arms 48, 49. The arcuate slots 54 function as stops to limit the up and down movement of the scale unit S.

A braking arrangement is provided at one end of the shaft 42 in order to facilitate control of the angular velocity of rotation of the rotor R. It includes two friction discs 55a, 55b (Fig. 5), the disc 55a being fixedly attached to the beam arm 48 and the disc 55b being keyed to the shaft 42. A spring washer 56 is interposed between the disc 55b and an adjustable nut 57. Tightening of the nut 57 increases the braking effect of the discs 55a, 55b and decreases the speed of rotation of the rotor R.

Rotation of the rotor R is controlled through a ratchet wheel 59 which is keyed to the other end of the shaft 42 and spaced from the beam arm 49 by a spacer sleeve 58 (Figs. 1, 3 and 5). The ratchet wheel has four equally spaced ratchet teeth 60, there being one tooth disposed in diametric alignment with each tray A, B, C, D of the rotor R. Each tooth adjacent its base is formed with a notch 61.

One of the teeth 60 and one of the notches 61 are engaged normally by a reciprocable latch or pawl 62 carried in bearings 63, 64 formed on the balance beam arm 49. This latch is normally held in an extended position and in engagement with a ratchet tooth 60 and its adjacent notch 61, by a compression spring 65 which surrounds the latch 62 and which is interposed between the bearing 64 and an adjustable nut 66 carried by the latch 62 (Figs. 1 and 5). Rotation of the rotor R in either direction is effectively prevented as long as the pawl 62 is in engagement with the ratchet wheel 59, counterclockwise rotation being stopped by the ratchet teeth 60 and any tendency towards clockwise rotation being overcome by notches 61. This holds one of the weighing trays A, B, C or D in a fixed position relative to the slicing chamber 21 for the reception of the berries therefrom.

The outer end of the latch 62 is secured to an armature 68 of a normally de-energized electric solenoid 69 mounted on the beam arm 49. The solenoid 69 when energized moves the armature to the right, as viewed in Fig. 1, thus disengaging the latch 62 from the ratchet wheel 59, when it is desired to permit rotation of the rotor R. Energizing of the solenoid is brought about by actuation of a movable element 75 of an electric switch 76 mounted on the side wall 14 of the housing 11 above the balance beam 49. The beam normally engages against the element 75 and thus keeps the switch open.

A cycle of operation of the scale unit S may be considered as starting with the rotor side (left hand side as seen in Fig. 1) of the scale unit S in an up position and the gate 30 in open position. When the desired weight of sliced berries, as determined by the setting of the weight 44, has filled the tray A which is in receiving position beneath the gate 30, the weight 44 is overbalanced and the scale unit S pivots about its fulcrums 52. Hence the rotor R and that portion of the balance beam yoke 46 on the rotor side of the fulcrums 52 move downwardly and thus release the movable element 75 of the switch 76. This closes the switch 76 and completes an electric circuit which energizes solenoid 69 and also energizes the gate solenoid 37 hereinbefore mentioned.

The energizing of solenoid 37 results in the closing of the sliding gate 30, thus shutting off the flow of sliced berries from the slicing chamber 21. Solenoid 69, when so energized, disengages the latch 62 from the ratchet wheel 59. The weight of the berries in the filled tray A thereupon causes the released rotor R to rotate in counter-clockwise direction. During this rotation of the rotor R the distance between center of gravity of the filled tray A and the fulcrums 52 is shortened, with the result that the weight 44 reasserts itself and moves the rotor side of the scale unit S upwardly. The balance beam arm 49 is thus brought into contact with and raises the movable switch element 75 to open the switch 76, thereby de-energizing the solenoids 37, 69.

The rotor R continues to rotate during this upward movement of the rotor side of the scale unit S but its rotation is limited to an arc of 90 degrees by the latch 62 which is immediately actuated by the opening of the switch 75, which occurs before the rotor R can complete 90 degrees of rotation.

The de-energizing of the solenoid 69 enables the spring 65 on the latch 62 to move the latch to extended position in time to intercept the next ratchet tooth 60 which is diametrically opposed to the succeeding empty tray B, thereby arresting the rotation of the rotor R with the tray B in receiving position beneath the gate 30. The simultaneous de-energizing of the solenoid 37 results in a flow of sliced berries from the slicing chamber 21 into the tray B, and the initiation of another cycle of operation of the scale unit S. Continued operation of the machine will of course continuously and successively bring the remaining trays C and D of the rotor R into receiving position.

During the latter portion of the 90 degree rotation of the rotor R, as the filled tray A rotates from its horizontal position to a depending vertical position, the berries fall out of the tray into an agitating chamber, compartment or section 77 which is formed by the lower portion of the housing 11. Located in the agitating section 77 is a rotary agitator 78 (Figs. 3 and 4), composed preferably of a plurality of mixing blades 79 of different diameters mounted on a shaft 80 journaled in bearings 81 mounted on the main frame 10. The agitator 78 is rotated by any suitable means.

During the time that a measured or predetermined weight of sliced berries is thus being segregated and delivered to the agitator 78, a proportionate amount of sugar is similarly being weighed out and delivered to the agitator 78 as will now be described.

The sugar is contained in or introduced into a sugar supply hopper 82 suitably mounted on the cover plate 12 of the main housing 11 adjacent the berry hopper 19. A gate 83, similar in construction and operation to the gate 30, is slidably mounted in a trackway 84 located at the bottom of the sugar supply hopper 82. The gate 83 is normally urged into open position by a compression spring 85, in which open position a series of openings 86 in the gate are in register with a series of openings 87 formed in the bottom of the sugar supply hopper 82, as shown in Figs. 3 and 4.

The end of the gate 82 opposite the spring 85 is secured to an armature 88 of a normally de-energized electric solenoid 89 (Figs. 1, 2 and 3) mounted on a bracket 90 bolted to the main housing side wall 14. The solenoid 89 is controlled by an electric switch 91 (Fig. 1) and moves the gate 83 into closed position when energized.

When the gate 83 is in open position, the sugar flows into an auxiliary weighing chamber or compartment 94 located beneath and in alignment with the sugar supply hopper 82. This sugar is received in an auxiliary bucket or tray A', which together with three other auxiliary trays B', C', D', form a sugar or preservative rotor R' of a sugar scale unit S'. The sugar scale unit S' is substantially similar in construction and operation to the berry scale unit S although somewhat smaller in size, and includes an auxiliary balance beam 97 which is bifurcated at one end to form a yoke 98 (Fig. 6) having parallel arms 99, 100 and a transverse arm 101. The outer end of the balance beam 97 carries an adjustable weight 102. The scale unit S' is balanced in two bearing notches 103 on two knife edge fulcrums 104, oppositely mounted on the main frame 10 (Figs. 1 and 6).

The sugar rotor R' includes a shaft 105 which passes through arcuate stop slots 106 cut in the side walls 13, 14 of the main housing 11 and is journalled in bearings formed at the extremities of the yoke 98.

A ratchet wheel 107 is fixedly secured to one end of the shaft 105 and is provided with four teeth 108 and four adjacent notches 109, corresponding to the trays A', B', C', D'. The teeth 108 and notches 109 cooperate with a reciprocable latch 110 carried by the beam arm 100 to control the rotation of the sugar rotor R'. The latch 110 is urged into extended position against an adjacent tooth 108 and notch 109 of the ratchet wheel, by a compression spring 111 mounted thereon. The outer end of the latch is secured to an armature 112 of a solenoid 113 carried by the beam arm 100 (Figs. 1 and 6). The solenoid 113 when energized is adapted to disengage the latch 110 from the ratchet wheel 107 in time with the release of the latch 62 of the berry scale unit S and is controlled by the switch 76. The two scale units S and S' are thus operated in timed relation.

An adjustable brake 114 similar to that described above in connection with the rotor shaft 42, is provided on the shaft 105.

The cycle of operation of the sugar scale unit S' is substantially synchronous with the cycle of operation of the berry scale unit S and may be considered as starting with the rotor R' in an up position and the gate 83 open.

When the predetermined or measured weight of sugar is received in the tray A' from the supply hopper 82, the rotor side of the scale unit S' moves downwardly. This results in the closing of the contacts of the switch 91 and the consequent energizing of the gate control solenoid 89 which closes the gate 83 and temporarily stops the flow of sugar. However, the rotor R' does not turn until it is released together with rotor R upon the closing of switch 76.

The rate of flow of sugar from hopper 82 is such that the switch 91 is preferably closed by the sugar scale unit S' before the switch 76 is closed by the berry scale unit S. Thus when the switch 76 closes, and energizes the solenoids 37, 69, it also energizes the solenoid 113 and the sugar latch 110 is thereby disengaged from the ratchet wheel 107 simultaneously with the disengagement of the berry latch 62 from its wheel 59. The weight of sugar in the already filled tray A' causes the rotor R' to rotate in a counter-clockwise direction and this rotates the tray into a sugar discharging position and brings the succeeding tray B' into sugar receiving position under the hopper 82.

Since the switch 76 controls both the solenoids 69 and 113, it follows that the rotors R and R' are released and start their rotation simultaneously. This rotation is then controlled by the rotor braking devices 55a, 55b, and 114 which are adjusted so that rotor R will rotate at an angular velocity that is substantially the same as or slightly greater than that of rotor R'. This adjustment assures that switch 76 will be opened by yoke arm 49 in ample time so that pawls 62 and 110 are again operable to engage ratchet wheels 59 and 107 in time to stop each rotor before it has rotated more than 90 degrees.

This opening of switch 76 de-energizes the solenoid 113 and the compression spring 111 immediately moves the latch 110 into extended position in time to intercept the succeeding ratchet tooth 108 which is disposed diametrically opposite to the tray B', thus stopping the rotor R' with the tray B' in receiving position.

During the rotation of the rotor R' the rotor side of the scale unit S' moves upwardly due to the shortening of the distance between the center of gravity of the filled tray A' and the fulcrums 104 and the consequent changing of the balance of the scale unit S'. This causes the beam arm 100 to open the switch 91, thereby opening the gate 83 and initiating another cycle of operation of the scale unit S'.

The sugar which is dumped from the sugar tray A' falls through a chute 115 (Fig. 4) extending from the bottom of sugar weighing chamber 94 and is delivered to the agitating section 77, where it is thoroughly mixed with the berries from the berry tray A by the agitator 78. The measured weights of berries and sugar in the agitating section 77 will always be proportionate since each measured discharge of a filled tray of the berry rotor R is accompanied by a corresponding measured discharge of a filled tray of the sugar rotor R'. The proportions of berries and sugar can be easily varied by simple adjustments of the sliding weights 44 and 102.

The mixture eventually proceeds through a discharge outlet 116 formed in the bottom of the protective housing 11 and is delivered to any desired place of deposit, preferably a container filling machine or directly into a container which may be located directly beneath the outlet 116.

Referring now to the wiring diagram illustrated in Fig. 2 it will be seen that lead wires 120, 121 are connected to a suitable source of direct current, shown here as a generator 122. The solenoids 37, 69, and 113 are connected in parallel to the leads 120, 121 by wires 123, 124, 125 and 126, 127, 128 respectively. The switch 76 is connected into the lead wire 121 between the generator 122 and the solenoid wires 126, 127, 128 so that it has simultaneous control of the current flowing in the solenoids 37, 69, and 113.

The sugar hopper gate control solenoid 89 is connected to the leads 120, 121, by wires 129, 130. The switch 91 is connected into the wire 130 as shown, so that it controls the solenoid 89 but not the solenoids 37, 69, and 113. The switch 76 has no control over the solenoid 89 since it is located beyond the junction of wire 130 and lead 121.

While the machine embodying and exemplifying the subject invention is particularly adapted to weighing and mixing proportionate amounts of berries and sugar, it is obviously capable of use with a great variety of products and materials. For some purposes it might be advantageous to modify parts of the machine to meet certain requirements. In one suggested modification the slicing knives 21 may be omitted and the chamber 21 used as a supply hopper.

It is also possible under some circumstances to so regulate the rate of flow of the product from chamber 21 by adjusting the size of the openings in the bottom of that chamber so that the sliding gate 30 can be eliminated, with little or no loss in the accuracy and efficiency of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for weighing proportional amounts of two materials, the combination of a primary chamber and an auxiliary chamber, separate supply hoppers for separately directing the materials into the respective primary and auxiliary chambers, primary and auxiliary weighing trays disposed in the respective chambers and located directly beneath the corresponding supply hoppers for receiving material to be weighed, primary and auxiliary balance beams having yoke arms extending alongside of said primary and auxiliary chambers and movably supporting the corresponding primary and auxiliary weighing trays, means for locking said trays against movement relative to their respective balance beams, a primary electric switch mounted on a wall of said primary chamber and engaging a yoke arm of said primary balance beam when said beam is in weighing position, means operating through said primary electric switch when the weighed product in said primary weighing tray moves said yoke arm for simultaneously unlocking both of said weighing trays to effect discharge of the two weighed products from said weighing trays, and braking means between said trays and balance beams for damping movement of said trays relative to said beams so that discharge of said products from the trays is effected gently.

2. In a machine for weighing proportional amounts of two materials, the combination of a primary chamber and an auxiliary chamber, a separate supply hopper communicating with each chamber for separately directing the materials into the respective chambers, a movable gate located in the bottom of each of said supply hoppers for controlling discharge of materials therefrom, primary and auxiliary balance beams pivotally mounted under said primary and auxiliary hoppers respectively, primary and auxiliary weighing trays disposed in the respective chambers and located directly beneath the corresponding supply hoppers for receiving material to be weighed, said weighing trays being fixed in horizontally disposed rotors each rotatably mounted in an end of one of said primary and auxiliary balance beams, means for locking said rotors with trays in receiving positions beneath said hoppers, a primary electric switch mounted on a wall of said primary chamber and engaging said primary balance beam when the beam is in weighing position, an auxiliary electric switch mounted on a wall of said auxiliary chamber and engaging said auxiliary balance beam when the beam is in weighing position, means operating through said auxiliary electric switch when the weighed product in said auxiliary weighing tray moves said auxiliary balance beam for moving said auxiliary gate to shut off discharge of said second material from its hopper, means operating through said primary electric switch when the weighed product in said primary weighing tray moves said primary balance beam for moving said primary gate to shut off discharge of said first material from its hopper and also for simultaneously unlocking said rotor locking means to release both of said weighing trays on their supporting balance beams to discharge the two weighed products and braking means operable on said rotors for damping the rotation of said trays so that the discharge of said products is gently effected and the trays stop in their rotation substantially as soon as the products are dropped therefrom.

3. A machine for slicing, weighing and mixing proportional amounts of fruit with preservatives, said machine comprising a food hopper for receiving whole fruit, slicing means in said hopper for slicing said whole fruit, a gate movably mounted in the bottom of said fruit hopper, a balance beam for weighing said sliced fruit, a fruit rotor pivotally mounted in one end of said balance beam, a tray beneath said gate and fixed in said fruit rotor, a food preservative hopper having a gate movably mounted in the bottom thereof, a balance beam for weighing said preservative, a preservative rotor pivotally mounted in one end of said preservative balance beam, a tray beneath said preservative hopper gate and fixed in said preservative rotor, a mixer disposed beneath said trays to receive from said trays the weighed proportional amounts of fruit and preservative, means responsive to movement of said balance beams for opening said gates to admit fruit and preservative to their respective trays and for closing said gates when proportional weighed amounts rest in said trays, means for locking said fruit and preservative rotors against rotation to hold said trays in receiving positions during the weighing of said proportional amounts of fruit and preservative, means responsive to the movement of said fruit balance beam for unlocking said rotors simultaneously when said trays have received their proportional amounts of fruit and preservative, braking means operable on said rotors for damping the rotation of said trays so that the delivery of said proportional amounts of fruit and preservative to said mixer is gentle and their mixture effected thoroughly, and a housing substantially enclosing said slicing means, gates, trays and mixer whereby the sliced fruit and preservative are protected from contamination during said slicing, weighing and mixing operations, said housing having an outlet through which the mixture is discharged.

JOHN G. BLAKEY.

References Cited in the file of this patent

UNITED STATES PATENTS

| Number | Name | Date |
| --- | --- | --- |
| 397,594 | Holley | Feb. 12, 1889 |
| 618,129 | Outcalt et al. | Jan. 24, 1899 |
| 632,284 | Seward | Sept. 5, 1899 |
| 711,934 | Bond | Oct. 28, 1902 |
| 1,001,503 | Cardwell et al. | Aug. 22, 1911 |
| 1,066,656 | Richardson | July 8, 1913 |
| 1,222,913 | Williams | Apr. 17, 1917 |
| 1,297,595 | Riley | Mar. 18, 1919 |
| 1,527,633 | De Bay | Feb. 24, 1925 |
| 1,750,244 | Robb | Mar. 11, 1930 |
| 1,849,984 | Koch | Mar. 15, 1932 |
| 2,066,012 | McCrery | Dec. 29, 1936 |
| 2,191,711 | Godat | Feb. 27, 1940 |
| 2,398,887 | Drinnon | Apr. 23, 1946 |

FOREIGN PATENTS

| Number | Country | Date |
| --- | --- | --- |
| 550,368 | Great Britain | 1943 |